T. A. NISSINEN.
ROASTING APPARATUS.
APPLICATION FILED JAN. 20, 1910.
1,086,843.
Patented Feb. 10, 1914.
6 SHEETS—SHEET 4.
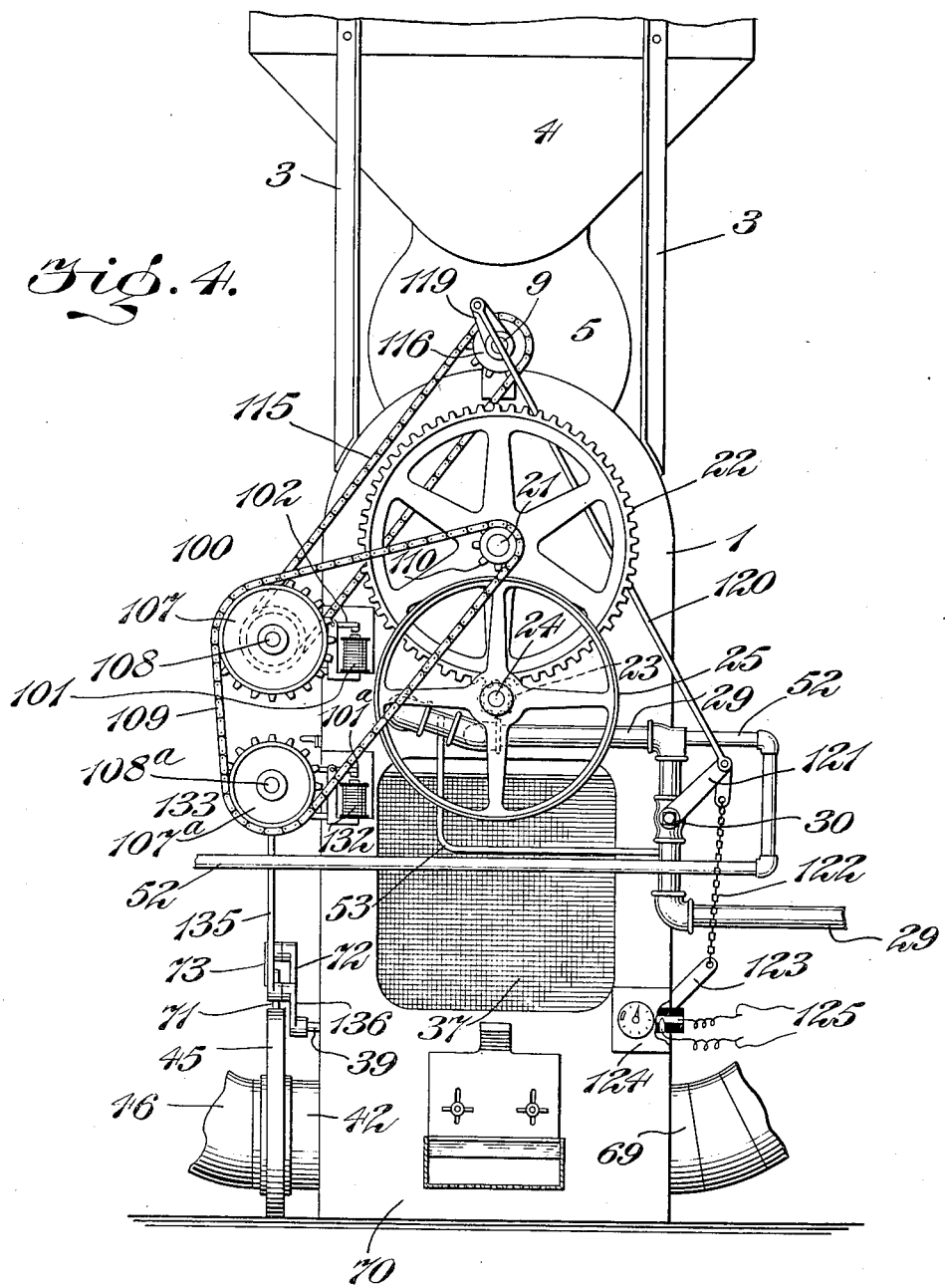
Fig. 4.
WITNESSES
INVENTOR
Toimi A. Nissinen
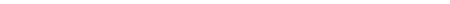
BY
ATTORNEY

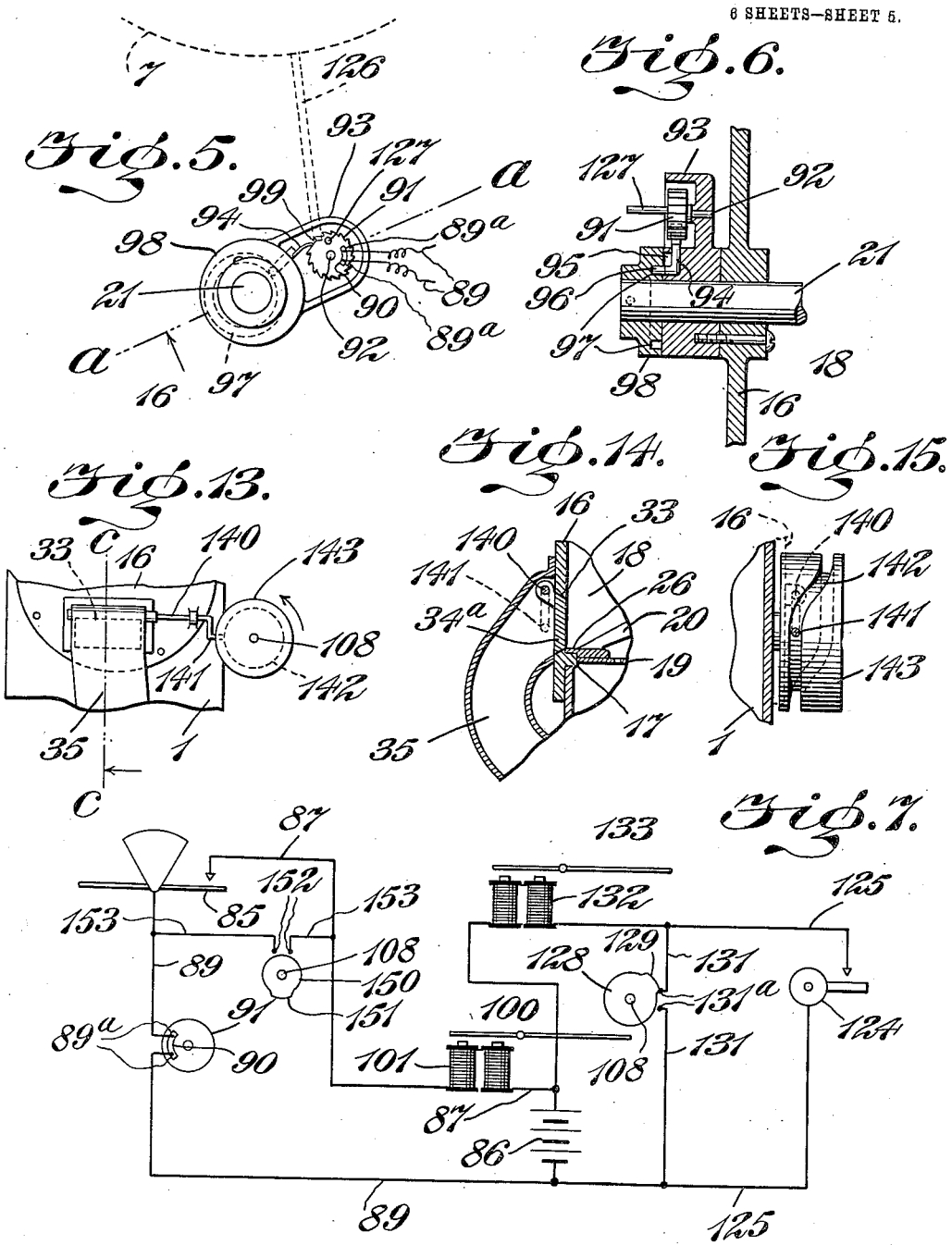

T. A. NISSINEN.
ROASTING APPARATUS.
APPLICATION FILED JAN. 20, 1910.
1,086,843.
Patented Feb. 10, 1914.
6 SHEETS—SHEET 6.
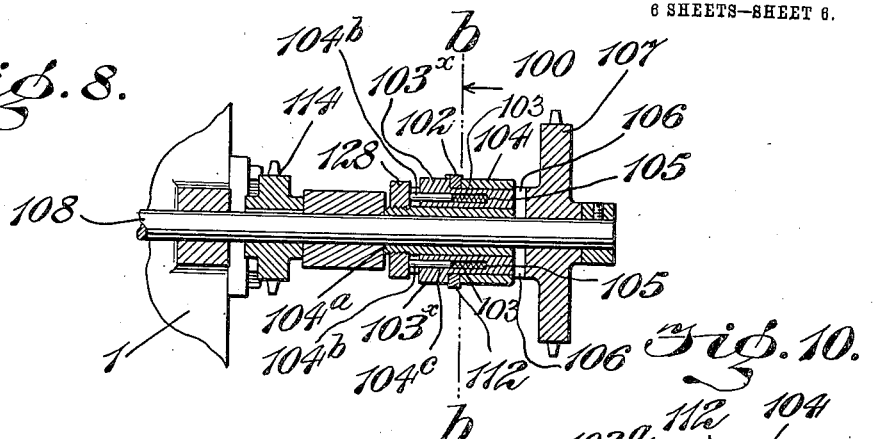
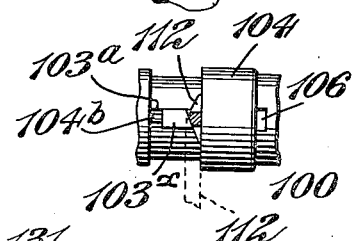
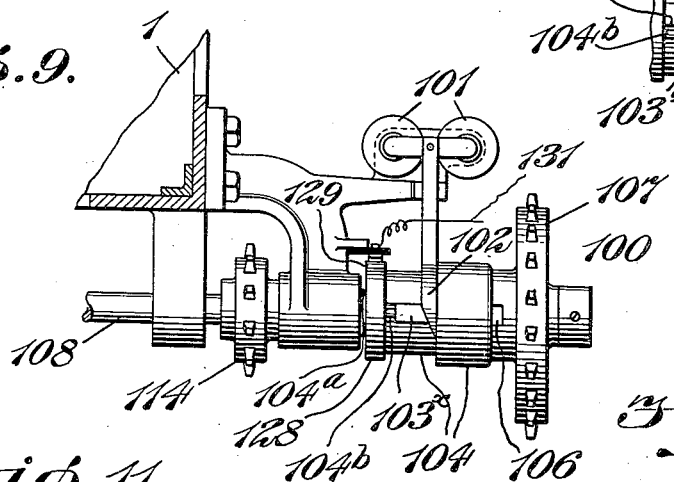
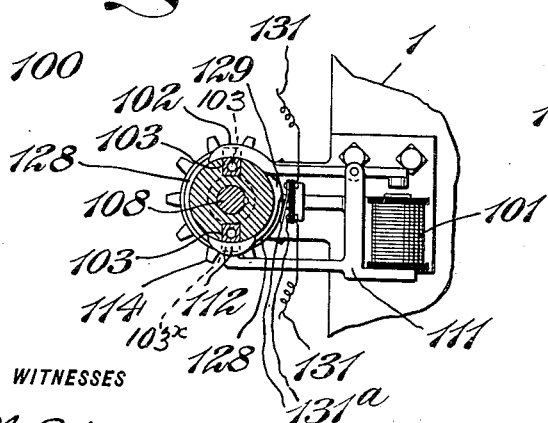
WITNESSES
INVENTOR
Toimi A. Nissinen
BY
ATTORNEY

UNITED STATES PATENT OFFICE.

TOIMI A. NISSINEN, OF NEW YORK, N. Y.

ROASTING APPARATUS.

1,086,843.

Specification of Letters Patent.    Patented Feb. 10, 1914.

Application filed January 20, 1910. Serial No. 539,017.

*To all whom it may concern:*

Be it known that I, TOIMI A. NISSINEN, a citizen of Finland, and subject of the Czar of Russia, and resident of the city, county, and State of New York, have invented certain Improvements in Roasting Apparatus, of which the following is a specification.

This invention relates to certain improvements in roasting apparatus or machines, and more particularly in that class of such devices which are especially designed and adapted for use in roasting coffee and the like, and the object of the invention is to provide a machine or apparatus of this general character of a simple and comparatively inexpensive nature, and of a compact, strong and durable construction, having certain features of novelty and improvement whereby material economy in time and labor, and increased convenience and efficiency are attained in the manufacture and practical use of the device, and whereby the roasting operation is performed in a substantially automatic way, so as to permit of dispensing with any extraordinary or peculiar skill or experience on the part of the attendant.

The invention consists in certain novel features of the construction, and combinations and arrangements of the several parts of the improved roasting apparatus or machine, whereby certain important advantages are attained and the device is rendered simpler, less expensive, and more effective and otherwise better adapted for use, all as will be hereinafter fully set forth.

The novel features of the invention will be carefully defined in the claims.

In order that my invention may be the better understood, I will now proceed to describe the same with reference to the accompanying drawings, wherein—

Figure 1:
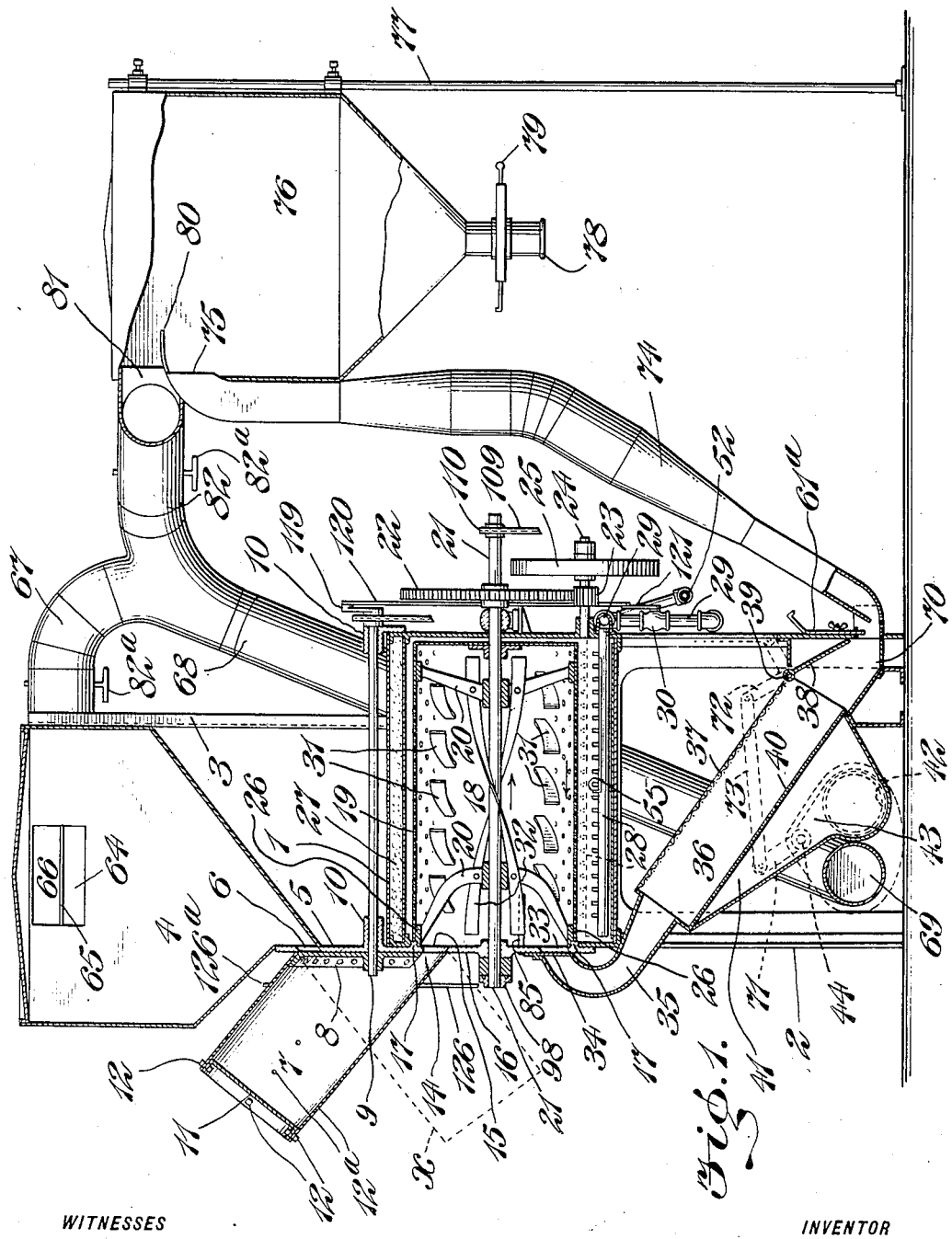
Figure 2:
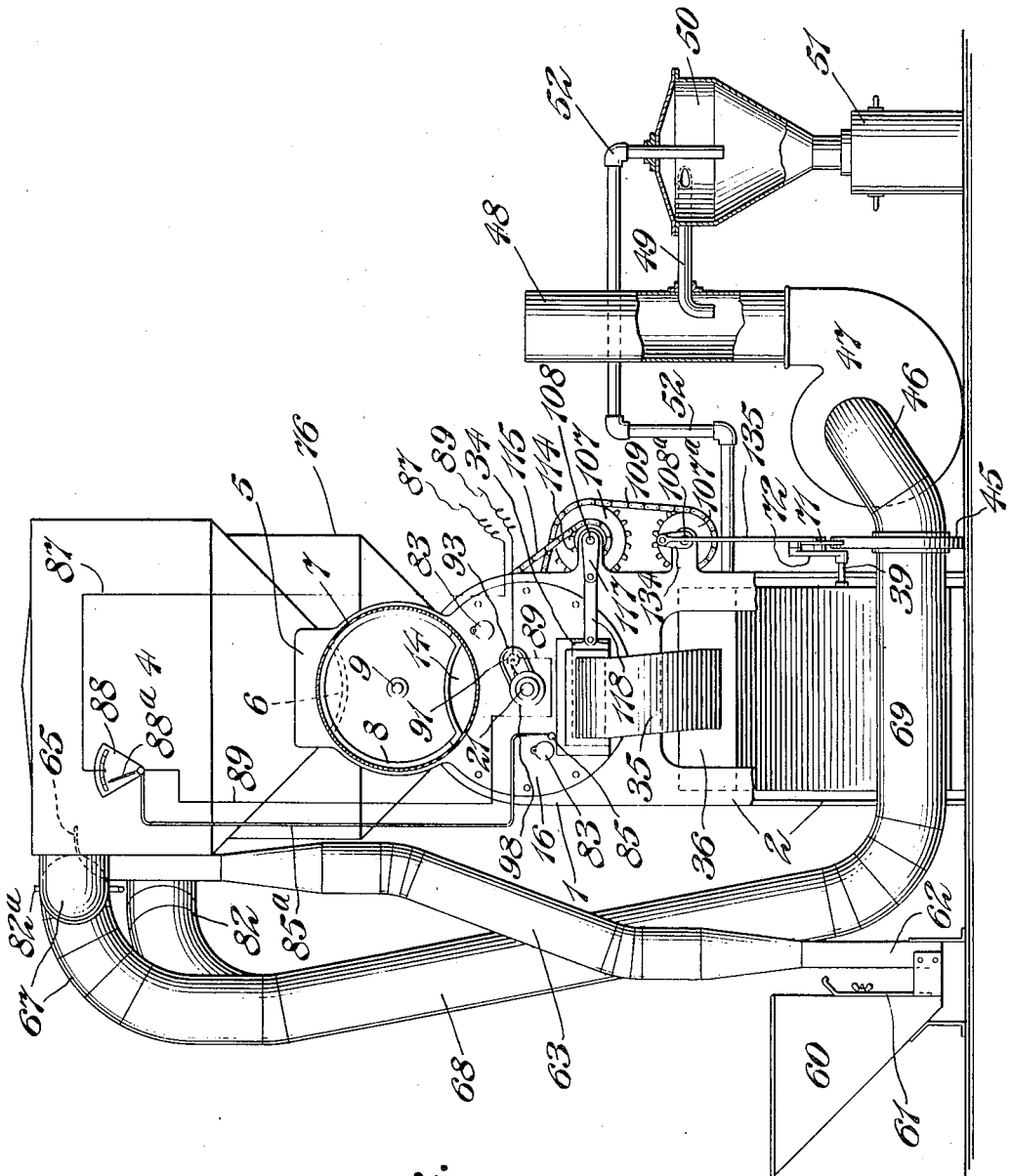
Figure 3:
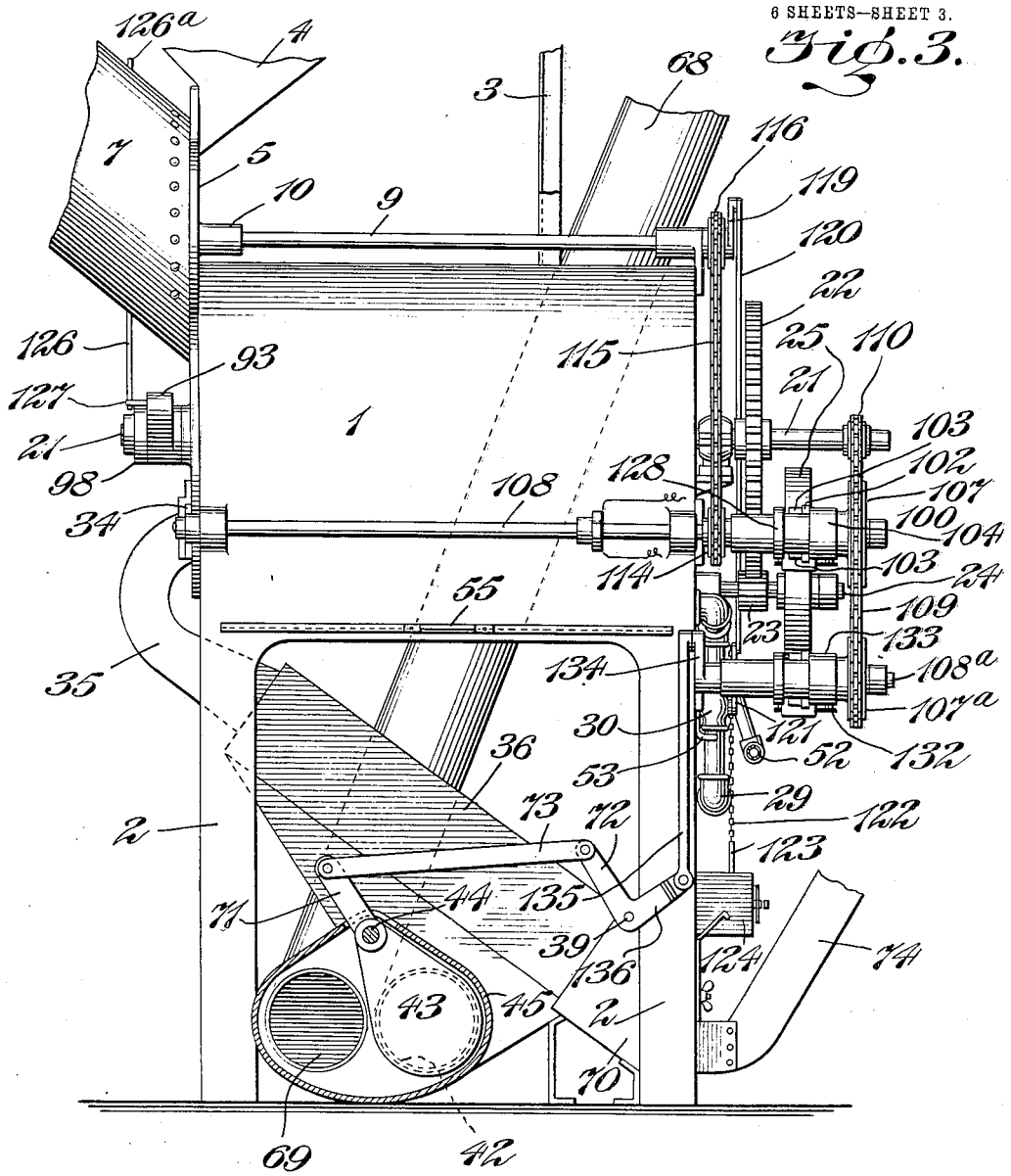

Figure 1 is a sectional side elevation taken vertically through an apparatus or machine constructed according to my invention; Fig. 2 is a front elevation of the improved machine or apparatus, portions thereof being broken away in order to better illustrate certain features of construction; Fig. 3 is a fragmentary sectional side elevation somewhat similar to Fig. 1, but drawn to an enlarged scale, and taken in a plane at one side of the roasting chamber; Fig. 4 is a fragmentary sectional rear elevation illustrating the driving devices at the rear end of the roasting chamber; Fig. 5 is an enlarged detail view showing the mechanically controlled circuit controlling means actuated from rotation of the roasting drum; Fig. 6 is a sectional view taken through said means in the plane indicated by line *a—a* in Fig. 5; Fig. 7 is a diagraphic view illustrating the electrical means for controlling the operation of the improved roasting machine or apparatus; Fig. 8 is a vertical section illustrating certain details of construction of one of the mechanical controlling devices employed in conjunction with the electrical controlling means shown diagraphically in Fig. 7; Fig. 9 is an enlarged detail view illustrating the parts shown in Fig. 8 in plan; Fig. 10 is a fragmentary detail view showing the underside of the mechanism illustrated in Figs. 8 and 9; Fig. 11 is a sectional view taken transversely through the mechanism shown in Figs. 8, 9 and 10, the plane of the section being indicated by the line *b—b* in Fig. 8; Fig. 12 is a perspective view showing one of the members of the mechanism illustrated in Figs. 8 to 11, detached and enlarged; Fig. 13 is a fragmentary front elevation showing a modified formation of one of the controlling devices comprised in my present invention; Fig. 14 is an enlarged sectional view taken vertically through such controlling devices in the plane indicated by line *c—c* in Fig. 13, and Fig. 15 is a view showing the cam for operating the controlling devices shown in Figs. 13 and 14.

As shown in these views the improved roasting machine or apparatus is provided with a closed casing 1 of any preferred form and dimensions, wherein the roasting chamber is inclosed, this casing being herein illustrated as supported upon legs 2, 2 so as to stand at a convenient elevation above the floor, and above said chamber, adjacent to the rear part thereof, are extended spaced standards 3, 3, which support the rear part of a storage chamber or hopper 4 positioned above the casing 1 and wherein a supply of the coffee or other material to be roasted is adapted to be contained in position to be readily discharged by gravity to the roasting chamber within the casing 1 under proper control as will be hereinafter explained.

As herein shown the casing 1 is provided with a removable front plate 16 affording access to the roasting chamber within the casing, and provided with an upward extension 5 which is directed above the forward end of the casing, and is made with a flattened forward bearing surface of substantially circular form, the central portion of which is pierced to produce a bearing 10 wherein is journaled the forward end of a horizontally extended shaft 9, the rear end of which has a bearing upon the rear end of the casing 1, and the forward end of which carries a valve member 8 of substantially circular outline, adapted to fit accurately upon the front bearing surface of the extension 5, and to traverse the same when the shaft 9 is rotated.

18 represents a roasting chamber inclosed within the casing 1 which is provided as shown in Fig. 1, with heat intercepting walls having a non-conducting packing 27 extended around the upper and lateral sides of said chamber, and 21 represents a shaft mounted to turn in suitable bearings at the forward and rear ends of the casing and extended horizontally along the axis of the roasting chamber, and provided at its rear end with a spur gear 22, meshing with the pinion 23 upon a driving shaft 24 carrying a pulley 25, over which a belt or band is adapted to be passed in a well known way to transmit power from any preferred source to rotate the shaft 21 and the roasting chamber.

Within the roasting chamber 18 the shaft 21 is provided with spiders 20 adjacent to the forward and rear walls of casing 1 each such spider having an annular peripheral portion 26 which is fitted within a cylindrical drum or shell 19 perforated about its walls and adapted to receive and contain the coffee or other material during the roasting operation. As shown herein the shell or drum 19 is closed at its rear end and has its forward end open so as to permit free access to its interior upon removal of the front plate 16 of the casing, and said front plate is provided upon its inner surface with an annular flange or shoulder 17 produced concentrically around the shaft 21 and affording a bearing whereon the annular peripheral portion 26 of the forward spider 20 has accurate contact in such a way as to prevent the escape of the material to be roasted from the forward end of the shell or drum.

The upper part of the extension 5 of the front plate 16 of the casing is apertured as shown at 6 to afford an outlet for the discharge of the material to be roasted from the supply chamber or hopper 4, and the front plate 16 of the casing is also apertured as indicated at 15, to permit the introduction of the material to be roasted into the chamber of the drum or shell 19, and the valve member 6 is adapted during the turning movement of shaft 9 to alternately close and open the respective ports 6 and 15, as will be hereinafter explained, said valve being provided at one side with a port 14 adapted in such rotation of shaft 9, to be successively brought into registry first with one and then with the other of the ports 6 and 15. Said valve 8 as herein shown, forms one end wall of a cylindrical feed member or conveyer 7 which is extended from the front wall of the casing with its axis at an inclination thereto as clearly shown in Figs. 1 and 3, and is provided at its outer end with an adjustable closure 11 held in position by means of screws or the like, as shown at 12, which are capable of interchangeable engagement with a plurality of apertures 12$^a$ positioned at different points in the length of said member 7 in such a manner as to vary the capacity of the interior chamber produced in said member between said closure 11 and the valve 8.

During rotatory movement of shaft 9 the angular feed member or conveyer 7 is adapted to be positioned at a downward inclination from the front plate of the casing as indicated in dotted lines at $x$ in Fig. 1, and in this position of the parts the port 14 of said valve 8 is adapted to be brought into registry with the port 6 at the lower part of the supply chamber or hopper 4, while the port 15 leading into the interior of the drum or shell 19 is closed by valve 8, so that the material to be roasted is permitted to be freely discharged within the upper part of the feed member or conveyer 7 in such a manner as to fill the same with a predetermined charge of such material dependent upon the position to which the closure 11 at the outer end of said member 7 has been adjusted, and during further rotatory movement of the shaft 9, the valve 8 is operated to close the port 6 of the supply chamber or hopper 4 and to position its port 14 in registry with the port 15 leading through the front plate 16 of the casing into the interior of the shell or drum 19, and when the ports shall have assumed this reversed position, the feed member or conveyer 7 will have assumed the position shown in full lines in Figs. 1 and 3, being inclined upwardly from the front plate of the casing so that the measured charge of the material to be roasted previously introduced through the ports 6 and 14 within said member or conveyer will be discharged therefrom through ports 14 and 15 into the interior of the shell or drum 19 in position to be roasted.

At the lower part of the roasting chamber is positioned a gas burner 28 adapted to be supplied with gas from a supply pipe 29 controlled by a valve or cock 30 and capable of operation to heat the shell or drum 19 to a sufficient degree to insure effective roasting of the material therein contained, the apertured walls of said drum or shell permitting free circulation of air within said drum, so as to assure a substantially uniform temperature throughout the mass of the material contained in the drum or shell, and upon the inner wall of the drum are arranged a plurality of spiral flanges or projections which are adapted during rotatory movement of the drum or shell to propel the material therein contained from the rear end of the drum toward the forward end thereof as indicated by the arrow at 31 in Fig. 1, while the arms of the spiders 20, 20 are provided adjacent to shaft 21 with spiral blades 32 set at inclinations reverse to those of the spiral flange projections 31, so as to be capable of operation adjacent to the central part of the drum to convey the material therein contained from the forward end of the drum toward the rear end thereof. By this arrangement of the spiral members 31 and 32 it will be evident that a substantially continuous agitation and shifting of the material contained in the drum or shell is maintained throughout the operation of roasting, so that the entire mass of such material is exposed to the heat in a substantially uniform manner throughout.

55 represents a pilot light for igniting the gas at burner 28, the same being supplied with gas from pipe 29 by way of a tube 53.

The front plate of the casing is provided at suitable points with apertures covered by hinged closures 83, as indicated in Fig. 2, through which the material in the drum or shell 19 may be inspected from time to time, and at which samples may be withdrawn so that the progress of the roasting may be ascertained, and adjacent to the lower part of the drum or shell, and communicating with the interior thereof is provided a discharge aperture or port 33 formed in said front wall of the casing and communicating by way of a downwardly extended conduit or passage 35, with a cooling chamber 36 into which the coffee or other material, after being roasted within the drum or shell 19, may be conveniently and quickly conveyed. A valve 34 guided for horizontal endwise sliding movement upon the front plate of the casing, and operated by mechanism to be hereinafter referred to controls the discharge of the material contained within the drum or shell 19 to the conduit or passage 35, the spiral members 31 and 32 operating at the completion of the roasting operation to insure the complete discharge of the roasted material from said drum or shell 19 through said port 33.

The cooling chamber 36 is provided with a floor or bottom 40 suitably apertured as indicated in Fig. 1 to permit the effective circulation of air or equivalent cooling fluid through the roasted material contained in said chamber and said floor or bottom is set at such a downward inclination from the point of communication of the passage or conduit 35 with the upper end thereof, as will insure the effective distribution of the coffee or other roasted material over said downwardly inclined bottom of the chamber when the same is discharged through said conduit or passage 35 from the roasting drum or shell 19.

The cooling chamber 36 is provided with an apertured cover or top wall 37 herein shown as produced from wire netting or the like and its lower or discharge end is provided with an adjustable closure or valve 38 carried upon a rock shaft 39 supported for turning movement at the upper part of said valve so that the latter is capable of being adjusted into closed position to retain the coffee or other roasted material within said chamber during the cooling operation or into opened position, as shown in Fig. 1, so that the coffee or other material when suitably cooled may be readily discharged from such chamber. Below the cooling chamber 36 is located a suction chamber 41 which has communication through a laterally directed duct 42 with a valve chamber 45, wherewith an exhaust blower or fan 47 has connection, by means of a conduit 46 in such a manner that air entering at the apertured top wall 37 of the cooling chamber may be drawn through the coffee or other roasted material therein to effectively cool the same, such air passing through the apertures of the inclined bottom 40 and through chambers 41 and 45 and ducts 42 and 46 to said fan or blower, whence the same is discharged through the outlet 48.

43 represents a valve mounted for swinging movement upon a stud or shaft 44 in the valve chamber 45 and adapted to be adjusted by means, to be hereinafter described, into and out of position to close the duct or passage 42, whereby it will be seen that when said valve is adjusted to a closed position, as indicated in Fig. 3 of the drawings, the blower is prevented from exerting suction within the suction chamber 41, and when said valve is adjusted to an open position the operation of the blower in exhausting the air from the cooling chamber is in no way interfered with and said blower is permitted to operate effectively, not merely to cool the coffee or other roasted material in the chamber 36, but also to separate dust, chaff and other light impurities therefrom, the same being discharged through the exhaust outlet 48. In the drawings I have shown the blower 47 also utilized for the production of a forced draft or blast for use in connection with the gas burner 28 for which purpose a small air pipe 49 has communication with the exhaust outlet 48, so that a desirable air pressure may be exerted within a separating hopper 50 wherein the air so withdrawn is caused to circulate in a well known way, and to deposit the dust and similar impurities suspended therein within a receptacle 51, the air being afterward discharged from said hopper 50 under pressure through a conduit 52 which has suitable connection with the gas pipe 29 as indicated in Figs. 1 and 4 of the drawings. I have also illustrated the blower 47 as capable of employment for elevating coffee or other material to be roasted to the storage chamber or hopper 4 for which purpose a receptacle 60 is provided at the floor, or otherwise so situated as to permit coffee or the like to be conveniently deposited therein from bags and provided with an adjustable gate 61 whereat the material is discharged from said receptacle to the lower open end or mouth 62 of an elevating chute or conduit 63 which is upwardly extended at one side of the casing 1 and has communication at its upper end as shown at 64 with the upper part of said supply chamber or hopper 4.

68 represents an exhaust passage or conduit also extended up at one side of the casing 1 and having its upper extremity provided with divergent branches 67 and 82, the branch 67 of said conduit having communication with said storage chamber or hopper 4 above the point of communication of the elevating conduit 63 thereof, the deflecting or baffle plate 65 being projected from the wall of the chamber or hopper 4 between the ports 66 and 64 of said conduits in order to prevent the passage of the elevated material to the conduit 68, and to compel such material to be deposited within the chamber or hopper 4.

The lower part of the conduit 68 is horizontally extended as indicated at 69 alongside the duct or passage 42, and like said duct or passage, has communication with the valve chamber 45 and is adapted to be controlled by the valve 43 therein, in such a manner that when the valve is adjusted to open the duct 42 to permit the material in chamber 36 to be cooled by the exhaust from the blower, communication of the conduit 69 with the valve chamber 45 is interrupted during the cooling of such material, and after the material in said chamber 36 shall have been cooled and the valve 43 adjusted to the position shown in Fig. 3, to close the duct 42, communication of the conduit 69 with the valve chamber is resumed so that the blower 47 is permitted to exert suction through the conduit 68 from the upper part of the supply chamber or hopper 4, and thence in an upward direction through the elevating conduit or passage 63 in such a manner as to effectively elevate the coffee or other material to be roasted from the receptacle 60 during the interval consumed in discharging and refilling the cooling chamber.

I have illustrated the valves 38 and 42 as adapted for simultaneous operation through the medium of arms 71 and 72, connected by a link 73 as clearly shown in Fig. 3, whereby it will be seen that when the valve 38 is closed to retain a charge of material to be cooled within the chamber 36, the valve 42 is adjusted automatically to establish communication from said chamber to the blower, in order that the coffee therein may be cooled, and when said valve 38 is reversely moved to permit the discharge of the roasted material from the cooling chamber, said valve 42 is automatically operated to cut off communication between chamber 36 and blower 47, and to establish communication from the blower through conduit 68 and hopper 4 to the upwardly directed elevating conduit 63 in such a way as to permit said hopper 4 to be replenished at such times as the blower is not in use for cooling the roasted material.

At the lower end of the cooling chamber 36 is located a boot or pocket 70 to which the coffee or other roasted material is discharged when the valve 38 is opened and this boot or pocket has communication under control of an adjustable valve 61$^a$ with the lower open end of an elevating chute or passage 74 extended upwardly at the rear end of the casing 1 and having its upper end arranged to discharge, as shown at 75, into a storage hopper or chamber 76 supported in any suitable way as by means of uprights 77, and having its lower end provided with a discharge outlet 78 controlled by a valve 79 so that the roasted material may be discharged from said hopper into a bag or receptacle suitably arranged beneath said outlet.

The rearwardly directed branch 82 of the draft conduit or passages 68 has communication as shown at 81 with the upper part of the storage chamber or hopper 76 above the point of communication of the elevating conduit 74 thereof, a deflector or baffle plate 80 being extended between the two openings 75 and 81 to prevent the discharge of coffee through said draft conduit 68, and to compel the coffee supplied to hopper 76 to be retained therein, and the construction and arrangements of the parts is such that when the valves 38 and 43 are adjusted to the positions shown in Figs. 1 and 3, to permit the cooled coffee to be discharged from chamber 36 into the boot or pocket 70, the draft or suction exerted by the blower through the conduit 68 will also be exerted through its branch 82 in order to elevate the coffee from said boot or pocket 70 through the upwardly directed elevating conduit 74, and to deposit the cooled roasted coffee within the storage chamber or hopper 76.

The boot or pocket 70 is adapted to retain stones and other heavy impurities which may be present in the roasted coffee so that the same are prevented from being elevated by the draft or suction of the blower through the conduit 74 into the storage hopper 76. Should stones or large particles of other heavy impurities collect in said boot or pocket, they may be removed therefrom from time to time as occasion requires.

85 represents a thermostat of any approved character arranged at the forward end of the roasting drum or shell 19, whereat the coffee collects during the roasting operation, by reason of the action of the spiral flanges or ribs 31 in directing such coffee automatically toward that end of the drum whereby it will be evident that said thermostat will be more effectively exposed to the heat of the coffee contained in said drum or shell during the roasting operation. As shown herein the thermostat has a tube 85$^a$ extended from it upon the front plate of the casing, affording pneumatic connection with a circuit closing indicating device 88 and comprising, as herein shown, a circuit closing pointer or index 88$^a$ capable of operation under control of the thermostat for making and breaking communication between conductors 87 and 89 comprised in an electric circuit which includes a generator 86. The circuit conductor 89 includes spaced contact points 89$^a$ positioned within a casing 93 secured upon the front plate of the casing 1 and traversed by the forward end of shaft 21 as clearly illustrated in Figs. 2, 5 and 6.

92 represents a stud within the casing 93 whereon a ratchet wheel 91 is mounted to turn carrying a contact plate 90 which is adapted when said wheel is turned to a certain position, as shown in Figs. 5 and 7, to close communication between the contact points 89$^a$ and permit the controlling circuit, including conductors 87 and 89, to be completed as will be hereinafter explained. The ratchet wheel 91 is toothed around its periphery for engagement with a pawl 94 the stem of which is mounted for endwise sliding movement in the boss of casing 93 which surrounds the protruding forward end of shaft 21 and the inner end of said stem has a lateral projection 96 which is adapted to play during the endwise movement of the pawl along a slotted opening 95 in the casing boss as shown in Fig. 6, the extremity of said lateral projection 96 being adapted for engagement with a cam groove 97 produced in a collar 98 secured upon the extremity of shaft 21 outside casing 93. By this means it will be evident that since the collar 98 turns in unison with shaft 21 to which drum 19 is affixed, as above described, the pawl 94 will be impelled endwise at each complete revolution of said drum to impart rotatory movement to ratchet wheel 91 to the extent of a single tooth, and when the drum 19 shall have completed a predetermined number of revolutions, such as may be necessary ordinarily for the termination of the roasting operation, the ratchet wheel 91 will have been so moved that a gap 99 in its toothed periphery will stand in position opposite to the pawl 94 so that if for any reason the roasting operation shall not have been completed during such predetermined number of revolutions of drum 19, such drum may be further operated for a sufficient time to complete the roasting operation without imparting further turning movement to the ratchet wheel 91, but so soon as the coffee or other material within the drum 19 shall have been raised to the desired temperature for the completion of the roasting operation, the thermostat 85 will be actuated to complete the controlling circuit, including conductors 87 and 89, the gap in said circuit between the terminals 89$^a$ having previously been bridged by the contact piece 90 carried by ratchet wheel 91 as above explained. In this way it will be seen that the effective roasting of the coffee or other material is assured by the provision of means for maintaining a desired temperature within the roasting chamber, which temperature is indicated at all times by the index or pointer 88$^a$, so that it may be maintained substantially constant by the attendant, and by the provision of means for assuring the continuance of such desired temperature throughout a predetermined time required for carrying the drum 19 through a number of revolutions sufficient to position the contact plate 90 for completing the controlling circuit between the terminals 89$^a$. In connection with the controlling means including said controlling circuit and the mechanical and thermal circuit closing means, I provide mechanism controlled therefrom for automatically controlling the operation of the feed member or conveyer 7 in replenishing the roasting drum with green coffee after the termination of each roasting operation, such means being indicated as a whole by 100 upon the drawings, and comprising an electromagnet 101, the coils of which are included in the controlling circuit, so that the magnet is energized and deënergized in unison with the operation of the thermostat 85 and ratchet wheel 91 in opening and closing said circuit.

The magnet 101 has an armature lever 102 provided with a tapered extremity which is normally positioned in the path of lugs or projections 103$^x$ formed upon the ends of clutch members 103 mounted for endwise sliding movement in guideways 103$^a$ extended parallel with the axis of a collar 104 keyed or otherwise secured upon a shaft 108 mounted to turn in suitable bearings at one side of the casing 1 and provided at its rear end with a loosely mounted sprocket wheel 107, the toothed periphery of which is engaged by a belt or band 109 which is passed around a driving pinion 110 secured upon the rear end of the driven drum shaft 21 in such a manner that said wheel 107 is continuously driven in unison with the movement of the drum 19.

The clutch members 103 are positioned at diametrically opposite sides of the collar 104 and each such member is guided upon a pin 104$^b$ projecting from a collar 128 having threaded engagement with a reduced extremity 104$^a$ of said collar 104, springs 105 contained in chambers in said clutch members and contacting upon the ends of said guide pins 104$^b$, being adapted to exert their tension to maintain said clutch members normally moved endwise toward the sprocket wheel 107 in such a way as to engage the extremities of said clutch members with notches 106 produced in the boss of said sprocket wheel and thereby to lock said wheel to the collar 104, and consequently to shaft 108, in order to compel rotation of said shaft in unison with the drum 19.

The forward end of the shaft 108 is extended alongside the casing 1 to the forward side thereof, whereat said shaft has a crank arm 117 coupled by a link 118 with the valve 34 which controls the discharge of the roasted material from drum or shell 19 through port 33 into the downwardly inclined passage 35, whereby it will be apparent that endwise reciprocatory movement is imparted to said valve during rotation of shaft 108 to move the valve into opened and closed position, and said shaft 108 also carries at its rear part a sprocket wheel 114, around which is passed a link belt 115 which is also extended around a similar sprocket wheel 116 secured upon the rear end of the shaft 9, whereby it will be evident that said shaft 9, together with the feed member or conveyer 7 at the forward end thereof, is actuated and controlled from the movement of shaft 108.

At the underside of the collar 104, diametrically opposite to the beveled extremity of the armature lever 102 of magnet 101, is a beveled shoe 112, connected with the frame 111 which supports said magnet, and this shoe 112 is also positioned in the path of the heads or projections 103$^x$ of the clutch members 103, so that as said members successively traverse the underside of the collar 104, said shoe 112 operates to move them endwise against the tension of springs 105, so as to withdraw their extremities from the notches 106 in the boss of the sprocket wheel 107, whereby it will be evident that when the armature lever is operated by a magnet 101 to release the uppermost member 103 from its beveled end and permit the corresponding spring to throw said member in engagement with the corresponding notch 106 of wheel 107, but one half revolution will be imparted to shaft 108 since said shoe 112 will operate to again withdraw said member 103 from the notch 106 of wheel 107 when said member reaches the underside of said collar 104, the deënergization of magnet 101 which occurs from interruption of the controlling circuit previous to the completion of such half revolution of shaft 108 serving to permit the beveled end of armature lever 102 to be again lowered into the position shown in Figs. 8, 9 and 11, so that the member 103 which had previously been engaged with the shoe 112 will at the completion of such half revolution of shaft 108, be engaged by said beveled end of lever 102 and thereby also be withdrawn from engagement with the appropriate notch 106 of sprocket wheel 107. By this arrangement of the parts it will be seen that after the drum or shell 19 shall have been charged with green coffee, and set in rotatory movement, the first revolutions of such drum or shell, dependent upon the number of teeth in the ratchet wheel 91 will operate to turn said wheel to an extent sufficient to bring the contact piece 90 into the position seen in Figs. 5 and 7, so that communication will be established between the terminals 89$^a$, 89$^a$ so as to bridge the break previously existing in the controlling circuit at that point, and by reason of the pawl 94 encountering the plain peripheral portion 99 of said wheel 91, the parts will remain in this position, as indicated in Figs. 5 and 7 for an indefinite time such as may be requisite to raise the temperature of the coffee or other material to be roasted within drum or shell 19 to the predetermined degree. Upon the attainment of such predetermined temperature, the thermostat 85 will be operated and through its pneumatic connection at 85$^a$ will actuate the pointer 88$^a$ of the indicating means 88 in such a way as to complete the circuit between conductors 87 and 89, whereupon current flowing through such circuit will energize magnet 101 and thereby disengage the clutch device at 100 so that the shaft 108 will be operated through a half revolution to slide the valve 34 endwise to open port 33 so that the roasted coffee may be discharged through such port during further rotation thereof, while the driving connection at 115 between shaft 108 and shaft 9 will be simultaneously operated to turn said shaft 109 together with the feed member or conveyer 7 through a half revolution sufficient to move said conveyer or feed member from the upwardly inclined position shown in Figs. 1 and 3 to the downwardly inclined position shown in Fig. 1, whereby the port 15 at the upper part of the casing front will be occluded, while the port 14 of said feed member or conveyer will be thrown into registry with the discharge port 6 of the storage or supply chamber or hopper 4 in order that a fresh charge of green coffee may be supplied from said hopper 4 to said feed member 7 ready to be conveyed to the roasting chamber in the further operation of the mechanism, as will be hereinafter more particularly explained.

The rear end of shaft 9 is provided with a crank arm 119 coupled by a link 120 with a lever 121 which controls the gas supply cock or valve 30 in such a manner as to cut off or reduce the gas supply to the burner 28 during the occurrence of revolution of shaft 9 at the termination of the roasting operation as above described, whereby excessive heating of the charge or useless consumption of gas is effectively prevented, and from lever 121 a chain or equivalent flexible connection 122 is extended to the controlling lever 123 of a time switch or governor 124, which may be of any desired description and is therefore only generally indicated in the drawings. This time switch 124 is capable of operation to control communication between conductors 125, 125, which are connected with the conductors 87 and 89 of the controlling circuit, so as to form a normally open shunt thereto wherein the generator 86 and the coils of magnet 101 are included, and said time switch of controller 124 is capable of being adjusted so as to operate when its mechanism is set by upward movement of the controlling lever 123, to complete the circuit between conductors 125, 125 after the lapse of a predetermined time, which may be varied within appropriate limits. In this way it will be seen that after the shafts 108 and 9 shall have been turned through a half revolution each as above described to open port 33 for the discharge of the coffee from drum 19 and to adjust feed member 7 to receive a fresh charge of green coffee from hopper 4, the mechanism of switch 124 is set in operation by lever 123, and during a predetermined interval of time sufficient for the discharge of the roasted charge from drum 19 and for the supply of a fresh charge to the feed member 7, the parts of the apparatus remain quiescent, with the exception of drum 19 which continues to turn for the discharge of its roasted contents. At the end of such predetermined time, the mechanism of said time switch or regulator 124 operates to establish communication between conductors 125, 125, whereupon the current traverses the shunt circuit including the windings of magnet 101, and again energizes said magnet, so as to withdraw the armature lever 102 thereof out of operative relation with the uppermost clutch member 103, whereupon the latter is pressed by its spring 105 into engagement with the notch 106 of wheel 107, so as to again lock shaft 108 to turn in unison with the drum shaft 21, the turning movement of said shaft 108 again continuing but for a half revolution thereof when it is terminated by the engagement of the lower clutch member with shoe 112 and by the engagement of the uppermost clutch member with armature lever 102 which will have meanwhile been again lowered as shown in Figs. 8 and 11. During such renewed rotatory movement of shaft 108, the crank connection at the forward end thereof will operate to move valve 34 endwise into closed relation with port 33, while the shaft 9 will be similarly turned through a half revolution by reason of the driving connection at 115, so that the feed member or conveyer 7, previously filled with a fresh charge of green coffee from hopper 4 as above described, will be returned from the downwardly inclined position shown in dotted lines in Fig. 1 to the upwardly inclined position shown in full lines in Figs. 1 and 3, the port 6 of supply chamber or hopper 4 being thereby occluded while the port 14 of said member or conveyer 7 is again brought into registry with the port 15 at the upper part of the casing front in order that the fresh charge of green coffee may freely pass down the inclined lower side of said member or conveyer 7 through such ports into the roasting drum or shell 19.

126 represents an actuating member or projection carried by the feed member or conveyer 7 and adapted, during the half revolution of such member last described, which serves to supply the fresh charge of green coffee to the roasting drum 19, to be engaged with a pin or projection 127 produced upon the ratchet wheel 91 which, during the operation of the mechanisms for discharging the roasted coffee and supplying a fresh charge thereof to drum 19 has been prevented from turning under the influence of pawl 94 by reason of the positioning of the plain peripheral portion 99 in line with said pawl, but during this last half revolution of member 7, last referred to, the member or projection 126 operates by engagement with said projection 127 of ratchet wheel 91 to forwardly move the same to an extent sufficient to throw the contact plate 90 out of bridging relation with the terminals 89$^a$ of the controlling circuit, whereby the same is interrupted at such terminals 89$^a$, and simultaneously to position the toothed peripheral surface of said ratchet wheel 91 in operative relation to pawl 94, so that rotatory movement may be again communicated to said ratchet wheel from the revolutions of the drum shaft 21.

During the withdrawal of the roasted charge and the supply of the fresh charge of coffee from and to the roasting shell or drum 19, the thermostat 85 will be so reduced as to temperature that the pneumatic connection thereof will be operated to retract the pointer 88$^a$ and interrupt the controlling circuit again at the indicating device 88, and such circuit being interrupted at these two points, the roasting operation, and thereafter the withdrawal of the roasted charge and supply of a fresh charge will be repeated as above described, the gas supply being properly controlled meanwhile in a substantially automatic manner, and the several elements of the controlling means also operating in a substantially automatic way to assure the proper sequence of the several operations as above set forth.

In connection with the apparatus constructed as above described, I also provide means for controlling the cooling of the coffee, and for the elevation of the coffee to the chambers or hoppers 4 and 76 in a substantially automatic manner, and this means I will now describe, premising, however, that the same may be omitted or varied, particularly as regards the means for controlling the elevation of the coffee, without material departure from the principles and spirit of the invention. As shown herein, such auxiliary controlling means comprises a mechanical device 133, substantially similar to the device 100 above described, and including an electro-magnet 132, shown in Fig. 4, operating through an armature lever 101$^a$ and clutch devices substantially like those shown in Figs. 8, 9, 10 and 11, to controllably connect a shaft 108$^a$ below and parallel with shaft 108 with a sprocket wheel 107$^a$ actuated by belt 109 from drum shaft 21, said shaft 108$^a$ being disconnected from the sprocket wheel at the termination of each half revolution in a way substantially similar to that in which shaft 108 is disconnected from sprocket wheel 107 as above set forth.

The magnet 132 has its windings included in a shunt from the main controlling circuit, such shunt circuit being normally open in order that said magnet 132 may not be energized except at appropriate times, and comprising conductors 131, 131, connected with the conductors 89 and 87 of the main controlling circuit in such a way that current may flow from the generator 86 through such shunt circuit when the same is closed. This auxiliary shunt circuit includes spaced terminals 131$^a$, shown upon the diagram Fig. 7, adapted to be placed in electrical communication through a contact plate 130, carried upon the collar 128 which as above stated has screw connection with the reduced extremity 104$^a$ of the collar 104 at the first described controlling device 100, the arrangement of these parts being clearly illustrated in Figs. 7, 9 and 11, and being such that when the device at 100 is actuated to open the valve 34 and permit the withdrawal of the roasted charge from the drum or shell 19, the cam surface 129 of collar 128 operates to press the shunt circuit terminals 131$^a$, 131$^a$ into electrical communication so as to complete such shunt circuit through the windings of electromagnet 132, which is thereupon energized to attract its armature 101$^a$ and permit the corresponding clutch member to be actuated to lock the shaft 108$^a$ to turn in unison with the sprocket wheel 107$^a$ under the influence of the drum shaft 21.

As shown in Figs. 2 and 3, the forward end of the shaft 108$^a$ has a crank arm 134 which is coupled by a pendent link 135 with a crank arm 136 upon the shaft 36 which carries the valve 39 controlling the discharge of the cooled coffee from the lower end of the downwardly inclined cooling chamber 36 into the boot or pocket 70, and the proportion and arrangement of the parts is such that when the shaft 108 is turned through a half revolution to open port 33 and permit the roasted charge to be delivered from drum 19 through passage 35 into the cooling chamber 36, the shaft 108$^a$ is simultaneously actuated and turned through a half revolution, whereby its crank connection with shaft 39 operates to move the valve 38 into position to close the lower end of the cooling chamber, whereby the hot roasted charge supplied through passage 35 is retained therein and is prevented from escaping into the boot or pocket 70. During such operation of valve 38 under the influence of shaft 108$^a$, the link connection 73 acts as above stated to simultaneously move the valve 43 from the position shown in full lines in Fig. 3 into a position wherein the duct or passage 69 is closed, while the duct or passage 42 is placed in communication with the exhaust fan or blower 47, which is thereupon permitted to draw air through the apertured top 37 of the cooling chamber, which air penetrates between the grains of roasted material in the cooling chamber and traverses the apertured bottom thereof, to the blower or fan being finally discharged at the exhaust outlet 48 as above described. In this way the coffee within the chamber 36 is effectively cooled, and at the same time is relieved of chaff, dust and other light impurities, such cooling and purifying operation taking place during the interval afforded by the operation of the time switch 124 before the filling of the drum with the fresh charge of green coffee as above described. The coils of magnet 132 are also included in the normally open shunt circuit first above referred to which is controlled by said time switch 124, so that it will be seen that said magnet 132 will be again energized when the time switch operates to close such normally open shunt circuit, such latter operation of magnet 132 taking place simultaneously with the second operation of magnet 101, so that as the shaft 108 receives its second half revolution, whereby valve 34 is closed and member 7 is positioned to supply the fresh charge of coffee to drum 19, shaft 108ª is also again moved through a second half revolution, its crank connection with shaft 39 operating to move valve 38 into opened position, so that the cooled and purified coffee may be discharged from the chamber 36 into the boot or pocket 70, while the valve 43 is simultaneously returned to the position shown in full lines in Fig. 3, interrupting the draft of air through chamber 36 to the blower, and permitting said blower to draw its supply of air through the passage or duct 69 from the upwardly directed blast conduit 68. The forwardly and rearwardly directed branches 67 and 82 of this conduit 68, which communicate, respectively with the chambers or hoppers 4 and 76, as above described, are provided with independently operable valves or dampers 82ª, 82ª, which permit of being manipulated to occlude either one or the other of such branches, so that the full force of the blast traversing conduit 68 may be directed through either of said hoppers or chambers 4 and 76, and consequently through either of the ascending elevating conduits 63 and 74 leading from said respective chambers or hoppers to the supply hopper 60 and the boot or pocket 70, respectively. By this means, when the shaft 108ª receives its second half revolution upon the operation of the time switch as aforesaid, the dampers 82ª, 82ª being properly adjusted, permit the blast to the blower 47 to be drawn through the branch 82 of the blast conduit 68 from the storage chamber or hopper 76, and such blast will consequently be exerted in an upward direction from the boot or pocket 70 through the elevating conduit 74 to elevate the cooled and purified coffee previously discharged into such boot or pocket from chamber 36 upwardly into the storage chamber or hopper 76, from which it may be dispensed through the discharge member 78 as above described.

By reason of the fact that a greater time will ordinarily be necessary for the completion of the roasting operation than will be required for the elevation of the roasted charge from the boot or pocket 70 to the storage chamber or hopper 76, it will be evident that it is also possible to so manipulate the dampers 82ª, 82ª, after the roasted charge has been elevated as to direct the entire blast to the blower through the branch 67 of blast conduit 68, whereupon such blast will be exerted in an upward direction from the supply hopper 60 to the supply chamber or hopper 4, and may be utilized for elevating green coffee to replenish the supply contained in such chamber or hopper 4 at such times as the blower is not being employed for cooling the roasted charge or for elevating the same into the storage chamber 76.

From the above description it will be seen that the improved roasting apparatus is of an extremely simple and comparatively inexpensive nature, and is particularly well adapted for use by reason of the increased efficiency and output attained, and of the convenience and substantially automatic nature of its operation which permits of dispensing with any peculiar skill or experience upon the part of the attendant, so that the apparatus is capable of advantageous use throughout an extremely wide field, and it will also be obvious from the above description that the apparatus is susceptible of some modification without material departure from the principles and spirit of the invention, and for this reason I do not desire to be understood as limiting myself to the precise formation and arrangement of the several parts as herein set forth in carrying out my invention in practice. For example, in certain cases, the longitudinally movable valve 34 controlling the port 33 may be replaced by a pivoted valve 34ª, as indicated in Figs. 13, 14 and 15, and such pivoted valve being mounted upon a rock shaft 140 having a crank arm 141 engaged in a peripheral cam groove 142 in a cam 143 on shaft 108 may be readily thrown first into opened position and afterward into closed position during the successive half revolutions of said shaft 108.

Having thus described my invention, what I claim and desire to secure by Letters Patent is:

1. An apparatus of the character described having a roasting chamber, a rotatable conveyer capable of movement to supply material to be roasted thereto, a thermostat exposed to the heat of the roasting chamber, and means controlled by the thermostat for controlling the rotary movement of the conveyer.

2. An apparatus of the character described having a roasting drum mounted for movement, a rotatable conveyer capable of movement to supply material to be roasted to said drum, and means controlled from the movement of the drum for controlling the rotary movement of the conveyer.

3. An apparatus of the character described having a supply chamber, a roasting chamber, a feed member capable of movement from the supply chamber to the roasting chamber to convey material to be roasted, a thermostat exposed to the heat of the roasting chamber, and means controlled by the thermostat for controlling the movement of the feed member.

4. An apparatus of the character described having a supply chamber, a roasting chamber, a feed member mounted to rotate and capable of operation to convey material to be roasted from the supply chamber to the roasting chamber, a thermostat exposed to the heat of the roasting chamber, and means controlled by the thermostat for controlling the rotatory movement of the feed member.

5. An apparatus of the character described having a supply chamber, a roasting chamber, a feed member adapted for movement to reversely inclined positions and capable of operation, when moved to one inclined position, to receive a charge of material from the supply chamber, and when moved to a reversely inclined position to deliver such charge to the roasting chamber, a thermostat exposed to the heat of the roasting chamber, and means controlled by the thermostat for controlling the movement of the feed member.

6. An apparatus of the character described having a supply chamber, a roasting chamber, a feed member adapted to receive a charge of material to be roasted from the supply chamber and capable of operation to deliver such charge to the roasting chamber, means for varying the capacity of the feed member, and means for actuating the feed member.

7. An apparatus of the character described having a supply chamber, a roasting chamber, a feed member adapted to receive a charge of material to be roasted from the supply chamber and capable of operation to deliver such charge to the roasting chamber, means for varying the capacity of the feed member, a thermostat exposed to the heat of the roasting chamber, and means controlled by the thermostat for controlling the operation of the feed member.

8. An apparatus of the character described having a supply chamber provided with a port, a roasting chamber also provided with a port, a feed member capable of movement and provided with a port adapted to be successively thrown into registry with the respective ports of the supply chamber and roasting chamber when said feed member is moved, and means for actuating the feed member.

9. An apparatus of the character described having a roasting chamber, a cooling chamber adapted to receive roasted material from the roasting chamber, a thermostat exposed to the heat within the roasting chamber, and means controlled by the thermostat and controlling the supply of roasted material from the roasting chamber to the cooling chamber.

10. An apparatus of the character described having a supply chamber, a roasting chamber, a feed member adapted to receive a charge of material to be roasted from the supply chamber, and capable of operation to deliver such charge to the roasting chamber, means for discharging the contents of the roasting chamber, and mechanism capable of operation first to discharge the contents of the roasting chamber and simultaneously to supply a charge of material to be roasted from the supply chamber to the feed member, and afterward to deliver such charge of material from the feed member to the roasting chamber.

11. An apparatus of the character described having a roasting chamber, a gas burner adapted to heat the same and provided with a gas supply pipe, mechanism for discharging the contents of the roasting chamber, and means controlled from said mechanism and controlling the supply of gas to said burner.

12. A device of the character described, comprising a rotating roaster, having a non-rotative head, means for heating the roaster, an inlet valve and an outlet valve appurtenant to the non-rotative head, mechanism operatively connected with the rotating roaster and interconnected with said valves for opening and closing the same, and a thermo-electrical device carried by the non-rotative head for actuating the connection between the valves and their operating mechanism.

13. An apparatus of the character described having a roasting chamber, a cooling chamber adapted to receive roasted material from the roasting chamber, mechanism for controllably supplying roasted material from the roasting chamber to the cooling chamber, and means controlled from said mechanism for directing a blast of air through the cooling chamber to cool the roasted material therein.

14. An apparatus of the character described having a roasting chamber, a cooling chamber adapted to receive roasted material from the roasting chamber, mechanism for controllably supplying roasted material from the roasting chamber to the cooling chamber, means for passing a blast of air through the cooling chamber to cool the roasted material therein, and means actuated from the controlling mechanism for discharging the cooled material from the cooling chamber.

15. An apparatus of the character described having a roasting chamber, a cooling chamber adapted to receive roasted material from the roasting chamber, a storage chamber, a conduit extended from the cooling chamber to the storage chamber, means for controlling the supply of roasted material from the roasting chamber to the cooling chamber, means for controlling the discharge of material from the cooling chamber, means for directing a blast of air through the cooling chamber to cool the roasted material therein, and means for directing a blast of air through said conduit to elevate the cooled material from the cooling chamber to the storage chamber.

16. An apparatus of the character described having a roasting chamber, a cooling chamber adapted to receive roasted material from the roasting chamber, means for controlling the supply of roasted material from the roasting chamber to the cooling chamber, means for controlling the discharge of material from the cooling chamber, a storage chamber, a conduit extended from the cooling chamber to said storage chamber, and controllable means capable of operation first to direct a blast of air through the cooling chamber to cool the roasted material therein, and afterward to direct a blast of air through said conduit for elevating the roasted material from the cooling chamber to the storage chamber.

17. An apparatus of the character described having a roasting chamber, a cooling chamber adapted to receive roasted material from the roasting chamber, means for controlling the supply of roasted material from the roasting chamber to the cooling chamber, means for controlling the discharge of material from the cooling chamber, a storage chamber, an elevating conduit affording communication between the cooling chamber and the storage chamber, a supply chamber, an elevating conduit adapted to convey material to the supply chamber, means for directing a blast of air through the cooling chamber to cool the roasted material therein, and controllable means capable of operation for directing a blast of air first through one elevating conduit to convey the cooled material from the cooling chamber to the storage chamber, and afterward through the other elevating conduit to elevate material to be roasted into the supply chamber.

18. In a device of the character described, a rotating roaster having a non-rotative head, means for heating the roaster, means for supplying fixed charges to the roaster, automatic means for actuating the supplying means, an outlet valve for said roaster arranged in said non-rotative head, and thermo-electrical mechanism appurtenant to said valve for setting the automatic actuating means of the supplying device in motion.

19. In a device of the character described, a rotating roaster having a nonrotative head, means for heating the roaster, an inlet valve and an outlet valve appurtenant to the non-rotative head, mechanism operatively connected with the rotating roaster and interconnected with said valves for opening and closing the same, and a thermo-electrical device for actuating the connection between the valves and their operating mechanism.

20. In a device of the character described, a rotating roaster, a non-rotative head, an inlet and an outlet valve mounted upon said head, means operatively connected with the rotary roaster for periodically actuating the inlet and outlet valves, and a thermo-electrical device for operatively connecting the valves and operating mechanism, whereby said valves are alternately opened and closed.

In witness whereof I have hereunto signed my name, in the presence of two subscribing witnesses.

TOIMI A. NISSINEN.

Witnesses:
J. D. COPLINGER,
W. C. ABBOTT.